United States Patent
Zhang et al.

(10) Patent No.: US 11,143,823 B2
(45) Date of Patent: Oct. 12, 2021

(54) FIBER OPTIC SLIP RING WITH THROUGH BORE

(71) Applicant: Princetel, Inc., Hamilton, NJ (US)

(72) Inventors: Boying B Zhang, Hamilton, NJ (US); Hong Zhang, Hamilton, NJ (US); Liangju Lu, Hamilton, NJ (US)

(73) Assignee: PRINCETEL, INC., Hamilton, NJ (US)

( * ) Notice: Subject to any disclaimer, the term of this patent is extended or adjusted under 35 U.S.C. 154(b) by 0 days.

(21) Appl. No.: 16/742,897

(22) Filed: Jan. 14, 2020

(65) Prior Publication Data
US 2021/0215883 A1   Jul. 15, 2021

(51) Int. Cl.
G02B 6/26 (2006.01)
G02B 6/36 (2006.01)
H01P 1/06 (2006.01)
H04B 10/25 (2013.01)

(52) U.S. Cl.
CPC ............ G02B 6/3604 (2013.01); H01P 1/06 (2013.01); H04B 10/25 (2013.01)

(58) Field of Classification Search
CPC ... G02B 6/3604; G02B 6/3528; G02B 6/3524
See application file for complete search history.

(56) References Cited

U.S. PATENT DOCUMENTS

| | | | | |
|---|---|---|---|---|
| 4,124,272 A * | 11/1978 | Henderson | ............ | G02B 6/3604 385/26 |
| 4,190,318 A * | 2/1980 | Upton, Jr. | ............ | G02B 6/3604 250/227.11 |
| 4,258,976 A * | 3/1981 | Scott | ............... | G02B 27/642 385/115 |
| 5,297,225 A * | 3/1994 | Snow | .................. | G02B 6/3604 250/227.11 |
| 5,978,438 A * | 11/1999 | Resnick | ................ | A61B 6/032 378/15 |
| 6,907,161 B2 | 6/2005 | Bowman | | |
| 6,980,714 B2 | 12/2005 | Lo | | |
| 8,380,024 B1 * | 2/2013 | Zhang | ................ | G02B 6/3604 385/26 |
| 8,611,753 B2 | 12/2013 | Lo | | |
| 9,263,838 B1 * | 2/2016 | Zhang | ............... | H01R 13/6473 |
| 2006/0193555 A1 * | 8/2006 | Schilling | ............. | G02B 6/0096 385/25 |

(Continued)

*Primary Examiner* — Eric Wong

(74) *Attorney, Agent, or Firm* — Klein, O'Neill & Singh, LLP

(57) ABSTRACT

The current disclosure shows a fiber optic slip ring with through bore, or an off-axis fiber optic rotary joint to provide transmission of optic data between mechanically rotational interface with a through bore. Said fiber optic slip ring with through bore may include a ring assembly and a brush block assembly within a rotor and a stator. Said ring assembly may include a ring, a ring holder and a fiber. Said brush block assembly may include a fiber brush, a brush block, an optic index matching fluid, and shaft seals. Said ring may be a donut-shaped waveguide with flat surface on one side. Said fiber brush may have an angled-surface, which is fully contacted with said flat surface on said ring at any time so that during the rotation of said rotor, the optic signal can be transmitted between said fiber and said fiber brush in either direction.

8 Claims, 3 Drawing Sheets

(56) References Cited

U.S. PATENT DOCUMENTS

| | | | |
|---|---|---|---|
| 2014/0341505 A1* | 11/2014 | Cottrell | G02B 6/3604 385/26 |
| 2015/0303633 A1* | 10/2015 | Altieri | H04B 5/0037 307/104 |
| 2017/0170879 A1* | 6/2017 | Weaver | H04Q 9/00 |
| 2018/0134234 A1* | 5/2018 | Nickolaou | G03B 17/561 |

* cited by examiner

FIBER OPTIC SLIP RING WITH THROUGH BORE

BACKGROUND

1. Technical Field

The disclosure is related generally to the field of apparatus for fiber optic communication, and more particularly, off-axis fiber optic rotary joint to provide transmission of optic data between mechanically rotational interface with a through bore.

2. Description of Related Art

It is well known that the devices to transmit optical data between two independently rotational members are called fiber optical rotary joints (FORJ), or fiber optic slip rings. A typical FORJ, consists of a fixed fiber collimator holder and a rotatable fiber collimator holder which are relatively rotatable to each other to allow transmission of optical signals through the rotational interface from fiber collimators on any one of the holders to the fiber collimators on another holder. There are single channel, two channel and multi-channel fiber optical rotary joints.

Almost all of FORJs on the market are categorized as on-axis fiber optical rotary joints because the optical paths are located along the axis of rotation or occupy the central space along the axis of rotation. If the central space along the rotational axis is not accessible, the optical light paths would not be allowed to pass through the central area along the rotational axis. Such devices are usually called off-axis fiber optic rotary joints, or fiber optic slip rings with through bore. Usually there is a through bore along the rotational axis to provide routing space for hydraulics, pneumatics, RF, or other physical media. Application examples of FORJs with through bore, include CT scanners, MRI scanners, tank turrets, marine propulsion systems, helicopters, machine tools, and winches.

In most prior teachings, the off-axis fiber optic rotary joints consist of a plurality of optical transmitters located on the rotor side, and multiple photo diodes on the stator side. The photo diodes are capable of receiving signals from the rotor side. In U.S. Pat. No. 6,907,161, the use of multiple inputs and pick-ups is required to keep the optical signals at a level that is sufficiently high to permit the photodiode receivers to operate. U.S. Pat. No. 6,980,714 proposed an improved off-axis fiber optic rotary joint with an associated reflector assembly trying to provide relatively large data rates, such as 1.25 Gbit/sec and greater. As the data rate increases, a photodiode having a smaller active area is required. The increased ratio of the fiber diameter to the photodiode area makes it more difficult to focus multiple optical signals onto the relatively small active area. In U.S. Pat. No. 8,611,753, an angular position encoder is used to track the location of the rotor relative to the stator such that the channel selector can appropriately switch the various 5.0 Gbit/sec signal streams to their respective sources. The rotor position encoder provides the locations at which the lasers are switched to carry data from another input signal stream.

As a counterpart, electrical slip rings are electromechanical devices that consist of rotatable parts (rotors) and stationary parts (stators). They allow the transmission of electrical signals and power between rotors and stators. A conventional electrical slip ring consists of conductive rings and brushes. Said rings are mounted on said rotor and insulated from it. Said brushes are usually fixed on said stators and run in contact with said rings, rubbing against the peripheral surfaces of the rings, transferring electrical power or signals to the rotor side.

SUMMARY

An objective of the current disclosure is to disclose a fiber optic slip ring with through bore for transmission of optic data between mechanically rotational interfaces with a through bore. The fiber optic slip rings can be single channel or multi-channel.

DETAIL DESCRIPTION

Detailed explanation of some embodiments are disclosed as follows.

Figure 1:
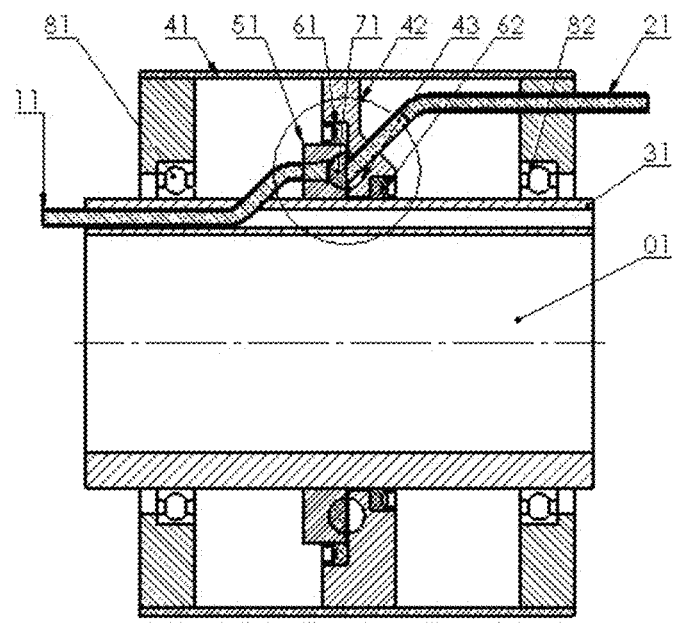
FIG. 1 is an embodiment of a single channel fiber optic slip ring.
Figure 2:
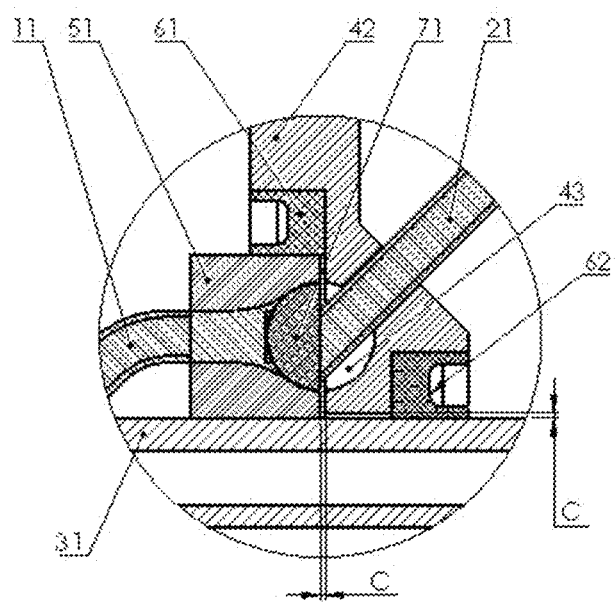
FIG. 2 shows the enlarged view of ring assembly and brush block assembly in FIG. 1.
Figure 3:
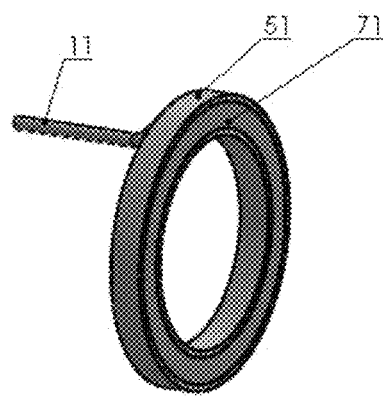
FIG. 3 shows a perspective view of the optic ring assembly in FIG. 1.
Figure 5:
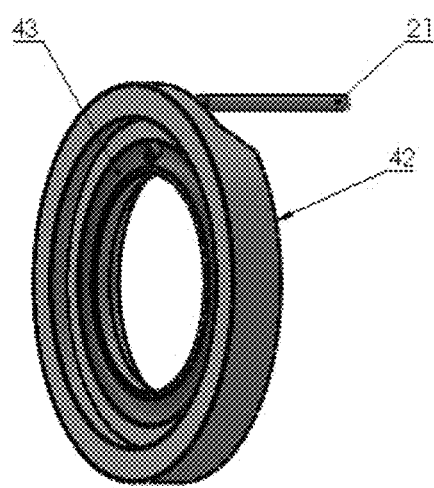
FIG. 5 shows a perspective view of the optic brush assembly in FIG. 1.

FIG. 1 shows an embodiment of a single channel fiber optic slip ring. Said slip ring assembly may include rotor 31 and stator 41. They may be relatively rotational through ball bearings 81 and 82. Said rotor 31 has a through bore 01. Inside said stator, there are a ring assembly (shown in FIG. 3) and a brush block assembly (shown in FIG. 5). Said ring assembly includes ring 71, ring holder 51 and optic fiber 11. Said brush block assembly includes fiber brush 21, brush block 42, optic index matching fluid 43, shaft seal 61 and 62. FIG. 2 is the enlarged view for ring assembly and brush block assembly.

Figure 4:
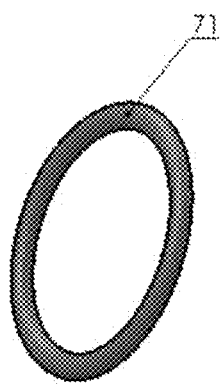
FIG. 4 shows a perspective view of an embodiment of the optic ring.

FIG. 4 shows the perspective view of an embodiment of ring 71. Said ring 71 is a donut-shaped waveguide with a flat surface on one side. Said ring holder 51 may have a material that is the same material as the cladding material of said optic fiber 11. Said ring holder 51 has a ring groove with the same donut-shape as said ring 71 so that said ring 71 can fit into said ring groove in ring holder 51. Said optic fiber 11 can be fused into said ring holder 51 from one side of ring holder 51. Said ring assembly may be mounted on said rotor 31 as shown in FIG. 1.

Said brush block 42 may have a block groove with the same donut-shape as said ring holder 51. Said block groove may be filled up with said optic index matching fluid 43 and sealed by said shaft seals 61 and 62. Said fiber brush 21 may have an angled-surface on one end. Said brush block 42 may have a block material that is the same material as the cladding material of said fiber brush 21. Said fiber brush 21 can be fused into said brush block 42 from one side of brush block 42. Said brush block assembly may be fixed with said stator 41 and has the clearance space "c" relative to said rotor 31 and said ring assembly respectively.

Said angled-surface on said fiber brush 21 may be fully contacted with said flat surface on said ring 71 at any time. So during the rotation of said rotor 31, the optic signal can be transmitted between said optic fiber 11 and said fiber brush 21 and, in either direction, with either optic fiber 11 or the fiber brush 21 transmitting or receiving.

Figure 6:
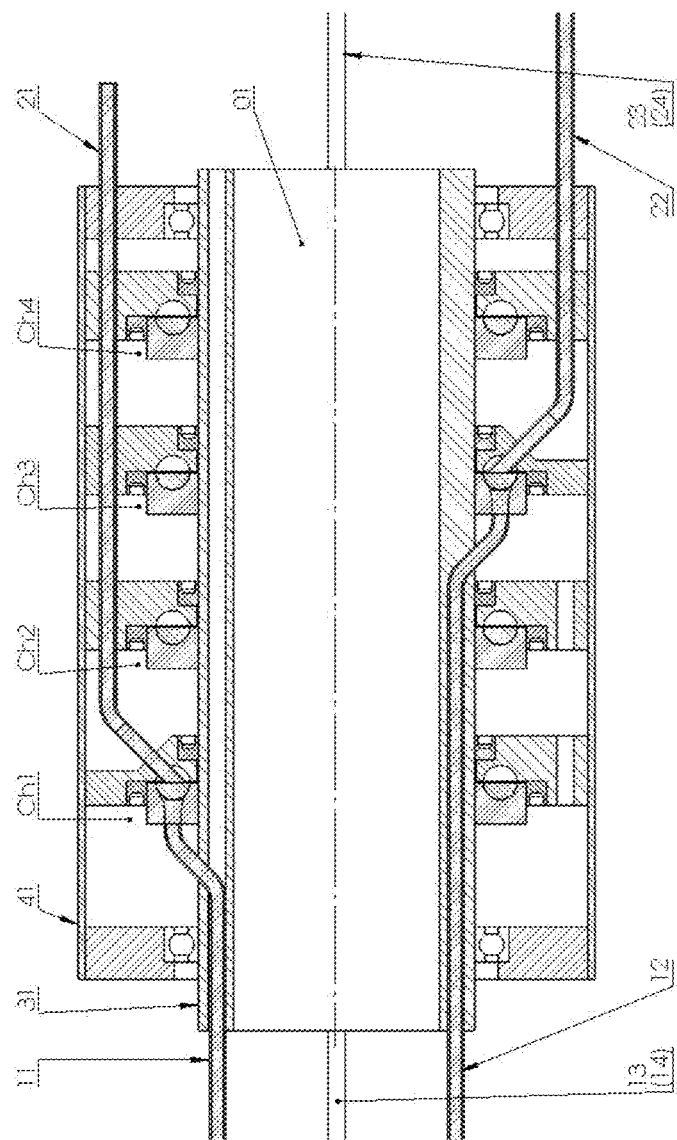
FIG. 6 shows an embodiment of a multi-channel fiber optic slip ring.

FIG. 6 shows an embodiment of a multi-channel fiber optic slip ring. The multi-channel fiber optic slip ring may include multiple ring assemblies and brush block assemblies, Ch1, Ch2, Ch3, Ch4, and more. The quantity of said assembly can be any number. All said ring assemblies may be mounted on the same rotor 31, and all said brush block assemblies may be mounted inside said the same stator 41. The optic fibers on rotor 31 are 11, 12, 13, 14, and more. The optic fibers on stator 41 side are 21, 22, 23, 24, and more. During the rotation of said rotor 31, the optic signal can be transmitted from said optic fibers 11, 12, 13, 14 and any other optic fibers on the rotor; to said optic fibers 21, 22, 23, 24, and any other optic fibers on the stator. With the same configuration the optic signal can be received by optic fibers 11, 12, 13, 14 and any other optic fibers on the rotor; and transmitted from optic fibers 21, 22, 23, 24, and any other optic fibers on the stator.

The invention claimed is:

1. A fiber optic rotary joint comprising:
a first part with a through bore and defining a longitudinal axis;
a second part with a through bore, the second part defining a longitudinal axis, the longitudinal axis of the first part being coaxially aligned to the longitudinal axis of the second part;
the first part being rotatable relative to the second part about the coaxially aligned longitudinal axes;
a ring assembly mounted on the second part, the ring assembly having an optic fiber and a donut shaped waveguide, the waveguide defining a contact surface and a radius, the radius being equal to a first distance from the coaxially aligned longitudinal axes;
a brush block assembly mounted to the first part, the brush block assembly having a fiber brush configured for optic communication with the optic fiber, the fiber brush defining a contact surface which is offset the first distance from the coaxially aligned longitudinal axes;
wherein the fiber brush is aligned to the contact surface of the waveguide, and the waveguide physically contacts the contact surface of the fiber brush when the joint rotates for providing data communication between the fiber optic of the ring assembly of the second part and the fiber brush of the brush block assembly of the first part.

2. The fiber optic rotary joint of claim 1, wherein the ring assembly further includes:
a ring, and
a ring holder,
the ring includes the donut-shaped waveguide with the contact surface on one side;
the optic fiber includes a cladding material, and the ring holder includes ring material, and wherein the ring material is the same material as the cladding material of the optic fiber;
the ring holder has a ring groove with a shape that is the same shape as the donut-shaped waveguide so that the ring can fit into the ring groove of the ring holder; and
the optic fiber is fused into the ring holder from one side of the ring holder.

3. The fiber optic rotary joint of claim 2, wherein the brush block assembly further comprises:
a brush block,
an optic index matching fluid, and
two shaft seals;
the brush block has a block groove with the same donut-shape as the ring holder;
the block groove on the brush block includes the optic index matching fluid and sealed by the two shaft seals;
the fiber brush has an angled-surface on one end which defines the contact surface;
the fiber brush includes a cladding material and the brush block includes a block material and wherein the block material is the same material as the cladding material of the fiber brush;
the fiber brush is fused into the brush block from one side of the brush block; and
the brush block assembly is fixed with the first part and has a clearance space relative to the rotatable part and the ring assembly respectively.

4. The fiber optic rotary joint of claim 3, wherein the angled-surface on the fiber brush is in physical contact with the contact surface on the ring so that during rotation of the rotatable part, an optic signal can be transmitted between the optic fiber in the ring assembly and the fiber brush in the brush block assembly.

5. A fiber optic rotary joint comprising:
a first part defining a longitudinal axis;
a second part defining a longitudinal axis, the longitudinal axis of the first part being coaxially aligned to the longitudinal axis of the second part;
the second part being rotatable relative to the first part about the longitudinal axes;
a ring assembly mounted on the second part, the ring assembly having an optic fiber and a waveguide, the waveguide having a radius which is equal to a first distance;
a brush block assembly mounted to the first part, the brush block assembly having a fiber brush configured for optic communication with the optic fiber, the fiber brush being offset the first distance from the coaxially aligned longitudinal axes so that the fiber brush and the waveguide are aligned to each other when the joint rotates for allowing communication between the optic fiber and the fiber brush.

6. The fiber optic rotary joint of claim 5, wherein ring assembly further includes:
a ring, and
a ring holder,
the ring includes a donut-shaped waveguide with a contact surface on one side;
the optic fiber includes a cladding material, and the ring holder includes ring material, and wherein the ring material is the same material as the cladding material of the optic fiber;
the ring holder has a ring groove with a shape that is the same shape as the donut-shaped waveguide so that the ring can fit into the ring groove in the ring holder; and
the optic fiber is fused into the ring holder from one side of the ring holder.

7. The fiber optic rotary joint of claim 6, wherein the brush block assembly further comprises:
a brush block,
an optic index matching fluid, and
two shaft seals;
the brush block has a block groove with the same donut-shape as the ring holder;
the block groove on the brush block is filled up with the optic index matching fluid and sealed by the two shaft seals;
the fiber brush has an angled-surface on one end;

the brush block has the same material as the cladding material of the fiber brush;

the fiber brush is fused into the brush block from one side of the brush block; and the brush block assembly is fixed with the first part and has a clearance space relative to the rotatable part and the ring assembly respectively.

8. The fiber optic rotary joint of claim 7, wherein the angled-surface on the fiber brush is in physical contact with the contact surface on the ring so that during the rotation of the rotatable part, optic signals can be transmitted between each the optic fiber in the ring assemblies and each the fiber brushes in the brush block assemblies.

\* \* \* \* \*